E. W. QUINCY.
Check-Rower for Corn-Planter.

No. 213,449.  Patented Mar. 18, 1879.

Attest:
F. B. Brock
D. G. Stuart

Inventor:
Edmund W. Quincy
By W. B. Richards,
Atty.

UNITED STATES PATENT OFFICE.

EDMUND W. QUINCY, OF PEORIA, ILLINOIS.

IMPROVEMENT IN CHECK-ROWERS FOR CORN-PLANTERS.

Specification forming part of Letters Patent No. 213,449, dated March 18, 1879; application filed February 6, 1879.

*To all whom it may concern:*

Be it known that I, EDMUND W. QUINCY, of Peoria, in the county of Peoria and State of Illinois, have invented certain new and useful Improvements in Check-Rowers for Corn-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
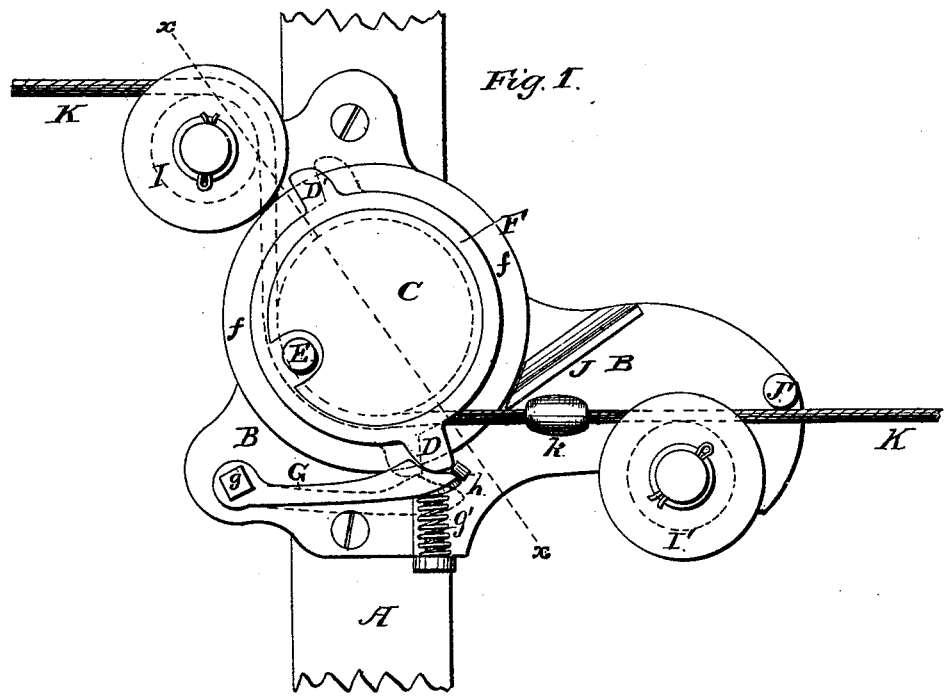
Figure 2:
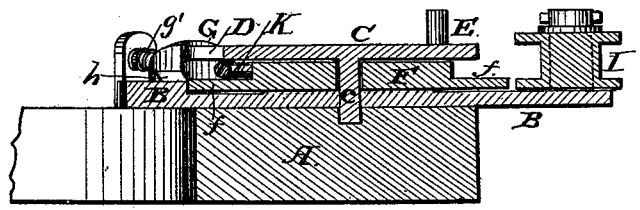

Figure 1 is a top-plan view of a construction embodying my invention. Fig. 2 is a sectional elevation in the line $x\ x$ in Fig. 1, showing the side A.

This invention relates to that class of check-rowers in which a knotted wire or cord is used to operate the same; and consists in a rotary plate having projecting lugs, and journaled above a fixed plate, so that the cord or wire may pass between the rotary and the fixed plates, and the knots as they recur act upon the rotary plate to give it an intermitting rotary motion.

It also consists in a rotary disk, placed between the rotary plate and fixed plate, so that the wire or cord will pass between the rotary disk and rotary plate, and the friction on the wire or cord be reduced to the lowest minimum.

It also consists in a spring-stop, which rests against one of the lugs on the rotary plate with sufficient force to retain it until a knot on the wire or cord strikes it and forces it past the stop.

It further consists in pulleys arranged so as to keep the knots on the wire or cord in contact with the lugs on the rotary plate the necessary and proper distance.

Referring to the drawings by letters, A represents a bar, on each end of which one of my check-rowers may be secured, and the bar A then fixed upon a corn-planter. B is a plate bolted to the bar A. C is a circular plate, with a central stud-bolt, $c$, by which it is journaled to the plate A, a little more than the thickness of an ordinary check-row wire or cord above said plate A. D D' are lugs projecting from opposite sides of the plate C, and preferably constructed each with a radial and an inclined side, as shown at Fig. 1 of the drawings. E is a crank-pin, projecting upward from the plate C, and may be connected by a link or otherwise with the seeding devices of a corn-planter. F is a circular disk, with a circumferential flange, $f$, and is journaled on the stud-bolt $c$ between the plates C and B. G is an arm, journaled at its end $g$ to the plate B, and its other end forced toward the plate C by a spring, $g'$, a distance limited by a lug, $h$, which projects upwardly from the plate B. I I' are pulleys, journaled above the plate B, and in such relative positions to the rotary plate C as shown at Fig. 1 of the drawings. J J' are guards. K is the wire or cord, with ordinary knots $k$.

In operation, the wire or cord is stretched across the field in the ordinary manner, and is placed between the rotary plate C and flange $f$ of the loose disk F, and around the disk F and pulleys I I', as plainly shown in the drawings. The spring-bar G is held by the lug $h$, so as to rest against the inclined side of the lug D and hold the plate C until a knot, $k$, strikes the radial side of lug D, and its inclined side forces the spring-arm G backward, and the plate C is carried around by the knot in contact with the lug D until the lug D' is brought around and rests against the spring-arm G, when the knot will cease to act on the lug D, and the motion of the plate C be arrested. The next recurring knot will act upon the lug D' in the same manner, and thus impart an intermitting rotary motion to the plate C and motion to the seed-slides through connection with the crank-pin E. The loose disk F will prevent friction of the knotted wire or cord.

What I claim as new, and desire to secure by Letters Patent, is—

1. In a check-rower a rotary plate, C, journaled above a fixed plate, in combination with a knotted check-row wire or cord, which passes between the rotary and fixed plates and acts upon lugs D D', projecting from the rotary plate, substantially as and for the purpose specified.

2. The rotary anti-friction disk F $f$, in combination with the rotary plate C and fixed plate B, and located so as to prevent friction of the knotted wire or cord on the fixed plate B, as and for the purpose specified.

3. The spring-stop arm G, in combination with a rotary plate, C, having lugs D D', and with a knotted check-row wire or cord, so as to act as a stop to the plate C until a knot on the wire or cord acts on the plate C and the lug thereon forces the spring-arm backward, as and for the purpose specified.

4. The pulleys I I', arranged in combination with the rotary plate C, having lugs D D', and a knotted wire or cord, K, so as to retain said knots in contact with either of said lugs until the other lug is brought round in contact with a spring-arm, G, substantially as and for the purpose specified.

5. The disk F, having a flange, $f$, in combination with rotary plate C, having lugs D D', fixed plate B, and knotted wire or cord K, substantially as described, and for the purpose specified.

In testimony that I claim the foregoing as my own I affix my signature in presence of two witnesses.

EDMUND W. QUINCY.

Witnesses:
 THOMAS McKEE,
 DANIEL CLARY.